June 23, 1970    A. CLEARY ET AL    3,516,176

TOUCH DETECTING TEACHING MACHINE

Filed Dec. 26, 1967    4 Sheets-Sheet 1

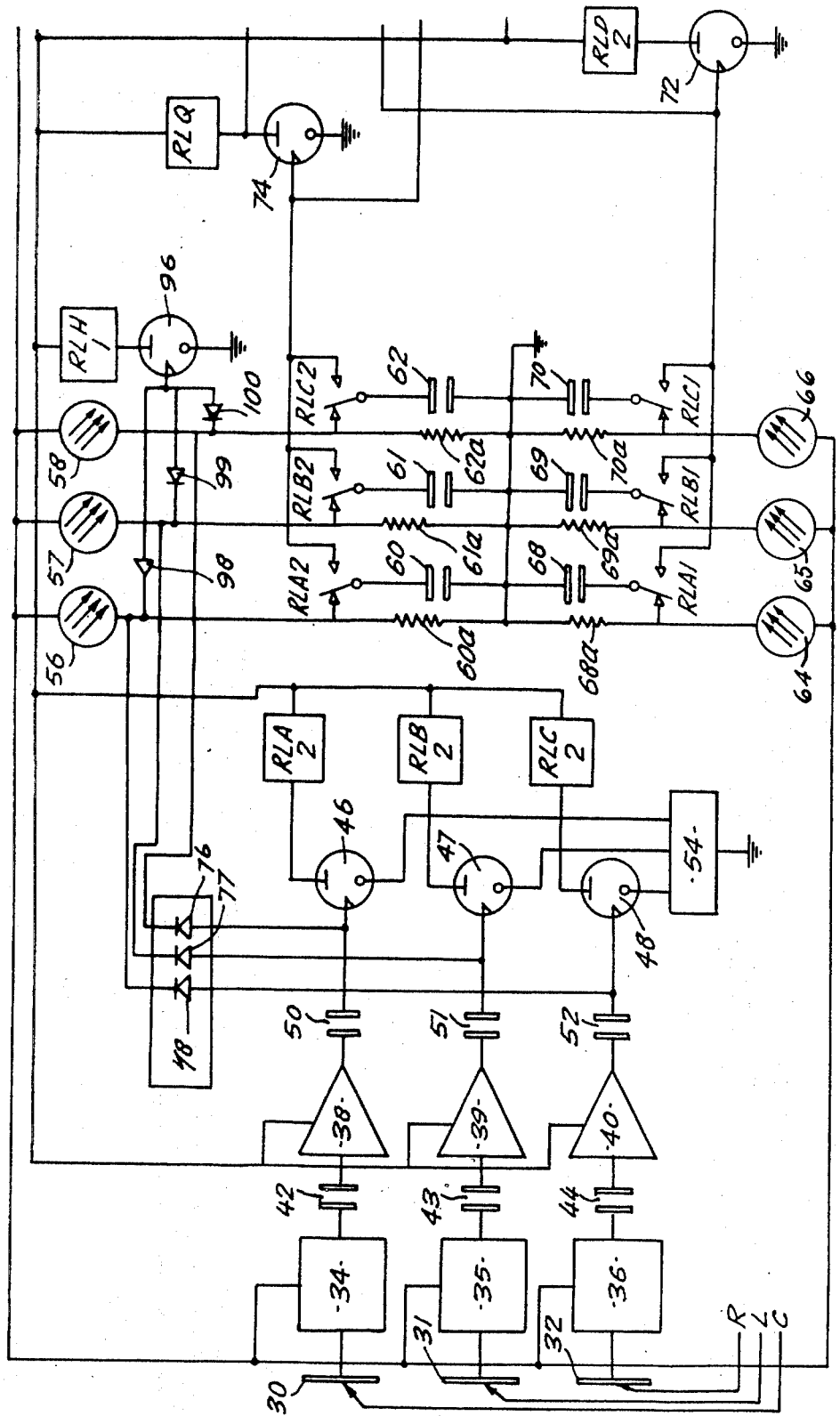

United States Patent Office 3,516,176
Patented June 23, 1970

3,516,176
TOUCH DETECTING TEACHING MACHINE
Alan Cleary, Derek W. Packham, and Jack C. Pashley, Teddington, England, assignors to Behavioural Research & Development, Ltd., Teddington, Middlesex, England, a corporation of Great Britain
Filed Dec. 26, 1967, Ser. No. 693,595
Int. Cl. G09b 7/06
U.S. Cl. 35—9
10 Claims

ABSTRACT OF THE DISCLOSURE

The invention relates to a touch detecting teaching machine for teaching young children or those with subnormal intelligence. The subject sits in front of a screen on which there are projected from behind two or more pictorial representations on one part of the screen and a word on the other part which is the correct description of one of the pictures. The areas of the screen on which the two or more pictorial representations are projected are sensitive to touch so that if the correct picture is touched by the subject the machine acknowledges this fact to the subject by speaking the word. The machine automatically moves on to the next set of pictures after a predetermined time whether or not the correct picture has been touched by the subject. An assessment of the subject's performance is continuously made, and the machine gives an indication when the subject's performance has reached a predetermined level so that the subject can be advanced to a more difficult set of pictures.

BACKGROUND OF THE INVENTION

Teaching machines available at the present time have been constructed for use by adults or school children of normal intelligence and consequently have required certain basic skills, e.g. the ability to read instructions, to press a series of buttons etc. before they can be operated successfully. It is therefore an object of the present invention to provide a machine which will solve some of the problems encountered when these skills cannot be assumed. It is thus principally intended for teaching young children who have not yet learned to read, adults or children of sub-normal intelligence and those persons under some form of physical and/or mental handicap. Whilst retaining the essential requirement that the subject should make frequent and observable responses, the machine creates an environment in which written material is meaningfully related to its pictorial and auditory equivalents.

SUMMARY OF THE INVENTION

According to the present invention there is provided a touch detecting teaching machine including means for displaying on one part of a display screen symbolic visual information and on the other part two or more further items one of which is related to the item in the first part of the screen, means for registering which of the two or more further items have been touched by the subject, means for giving an audible indication only if the related item is touched and means for changing the display to another display after a predetermined interval of time from the instant of touching whether or not the related item has been touched.

The touch detecting teaching machine preferably includes a slide projector having an automatic continuous slide changing mechanism, a tape recorder having a tape formed into a continuous loop and a loud-speaker whereby the subject hears a spoken word which describes the correct item if he has touched the correct item displayed on the screen, the speaker being muted if the incorrect item is touched. The tape may also have recorded on a second channel a series of synchronization pulses whereby the advance of the slide mechanism and the resetting of all the electronic circuits may be effected.

In order to register the response of the subject, there are provided as many conductive areas on the screen as there are items displayed on said other part of the screen, said conductive areas each being connected to a high impedance source and amplifier input, whereby if the area is touched a pulse appears at the output from the amplifier, this pulse being utilized to register that the particular area has been touched.

Means are preferably provided to ensure that if more than one conductive area is touched then only the first one to be touched is registered. Means are also preferably provided to inhibit the advancing of the slide mechanism in the case where one of the items is blanked out should the conductive area corresponding with that item be touched.

To assess the performance level of the subject a computer is preferably provided whereby the performance of the subject is computed and compared with a set criterion. When this criterion is exceeded then it is time for the material to be changed to something a little more difficult. In the case where less than three items are displayed the computer is preferably rendered inoperative.

DESCRIPTION OF THE DRAWINGS

The present invention will now be described in gerater detail by way of example with reference to the accompanying drawings, wherein:

FIGS. 4A—4C are sections of a circuit diagram partly in block form of a preferred form of touch detecting machine.

DESCRIPTION OF THE PREFERRED EMBODIMENT

Figure 1:
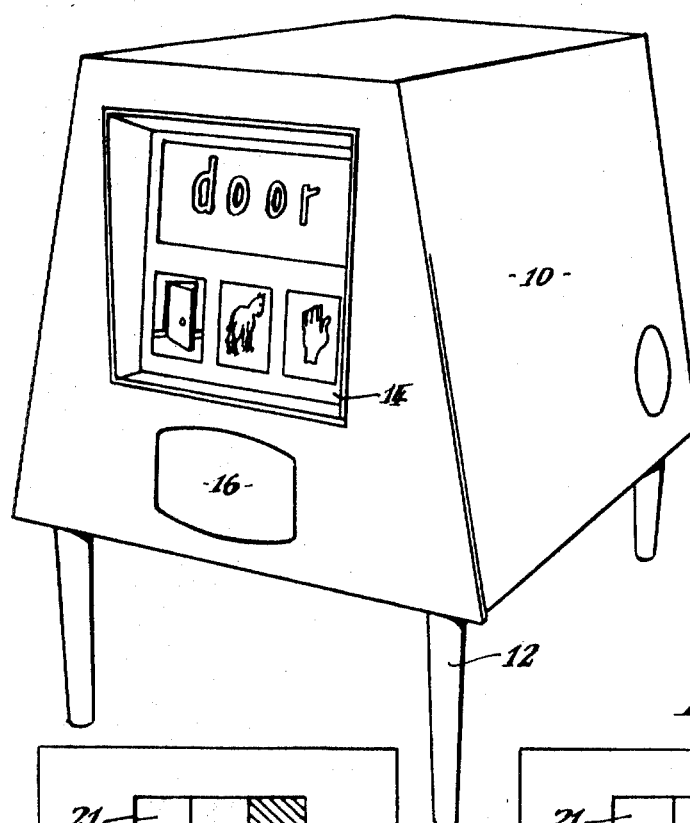
FIG. 1 is a perspective view of the subject's console.
Figure 3:
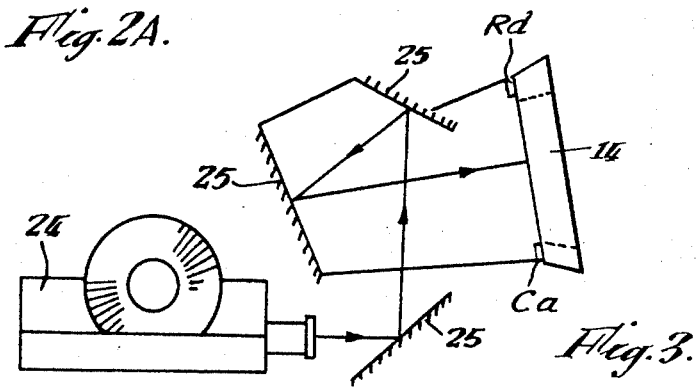
FIG. 3 is a diagram of the projection system.

Referring first to FIG. 1 the subject's console comprises a cabinet 10 mounted on legs 12 and having a display screen 14 on the front face of the cabinet and a loud speaker 16. The projection system shown in FIG. 3 is housed inside the cabinet 10. Shown on the screen 14 is a typical slide the upper half of which contains a written word such as "door" and the lower half showing three pictorial representations of respectively from left to right, a door, a horse, and a hand.

Figures 2A, 2B:
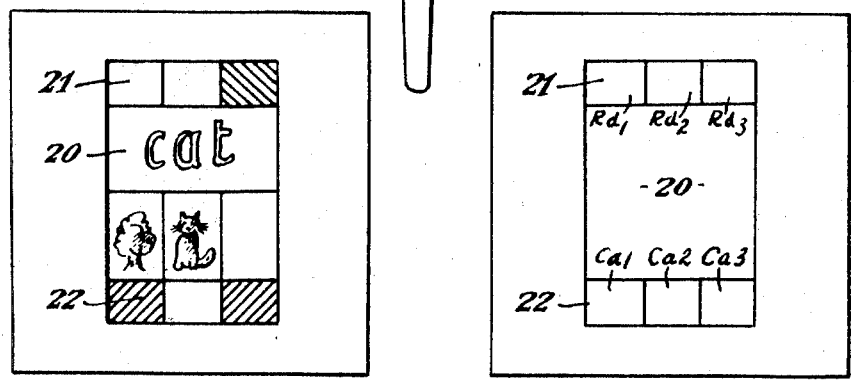
FIGS. 2A and 2B are diagrams showing the arrangement of material on the slides and the coding format.

FIGS. 2A and 2B show a typical slide which is used to project the picture on the screen 14. This comprises a central area 20 on which the word and the pictorial representations are printed, and upper and lower zones 21 and 22 which are not projected on the screen 14. Each zone is divided into three equal sections $R_{d1}$, $R_{d2}$, and $R_{d3}$ for the upper zone 21 and $C_{a1}$, $C_{a2}$ and $C_{a3}$ for the lower zone 22. These six sections are arranged to cooperate with respective photo-conductive cells arranged behind the screen 14 as shown in FIG. 3. The projection system comprises a re-circulating tray automatic slide projector 24 taking 100 plastic mounted standard miniature slides and having a 75 mm. lens. In order to reduce the optical length of the projection system, the optical path is folded around on itself by means of three flat mirrors 25.

FIG. 2A shows a slide which is used for beginners, since it has only two pictorial representations. The third section of the lower half of the central area 20 is blank. The coding which operates the photo-conductive cells is shown as clear when the photo-conductive cell is to be illuminated and hatched (in practice blacked out) when the respective photo-conductive cell is not to be illuminated. The photo-conductive cells associated with the zone 21 are for the frame advance and those associated with the zone 22 are for the correct alternative. The coding on the slides is thus as follows. In the case where the lower half of the central area 20 contains three pictures the three sections of the zone 21 are all clear since it is desired that the frame be advanced by one step whether or not the subject touches the correct section. In the case of the slide as shown which is used for beginners it is desirable to make the subject realize the object of the teaching machine. The third section of the zone 21 is blacked out so that if the subject touches the blank area on the screen the frame will be inhibited from advancing until one of the other two sections have been touched. The lower zone 22 has the centre section clear and the two end sections blacked out so that only the photo-conductive cell associated with the section $C_{a2}$ will be illuminated, to indicate that the picture of the cat is related to the word "cat" displayed in the upper half of the central area 20.

The above convention for the coding can thus be summarized as follows:

White=1    Black=0

Figure 4B:
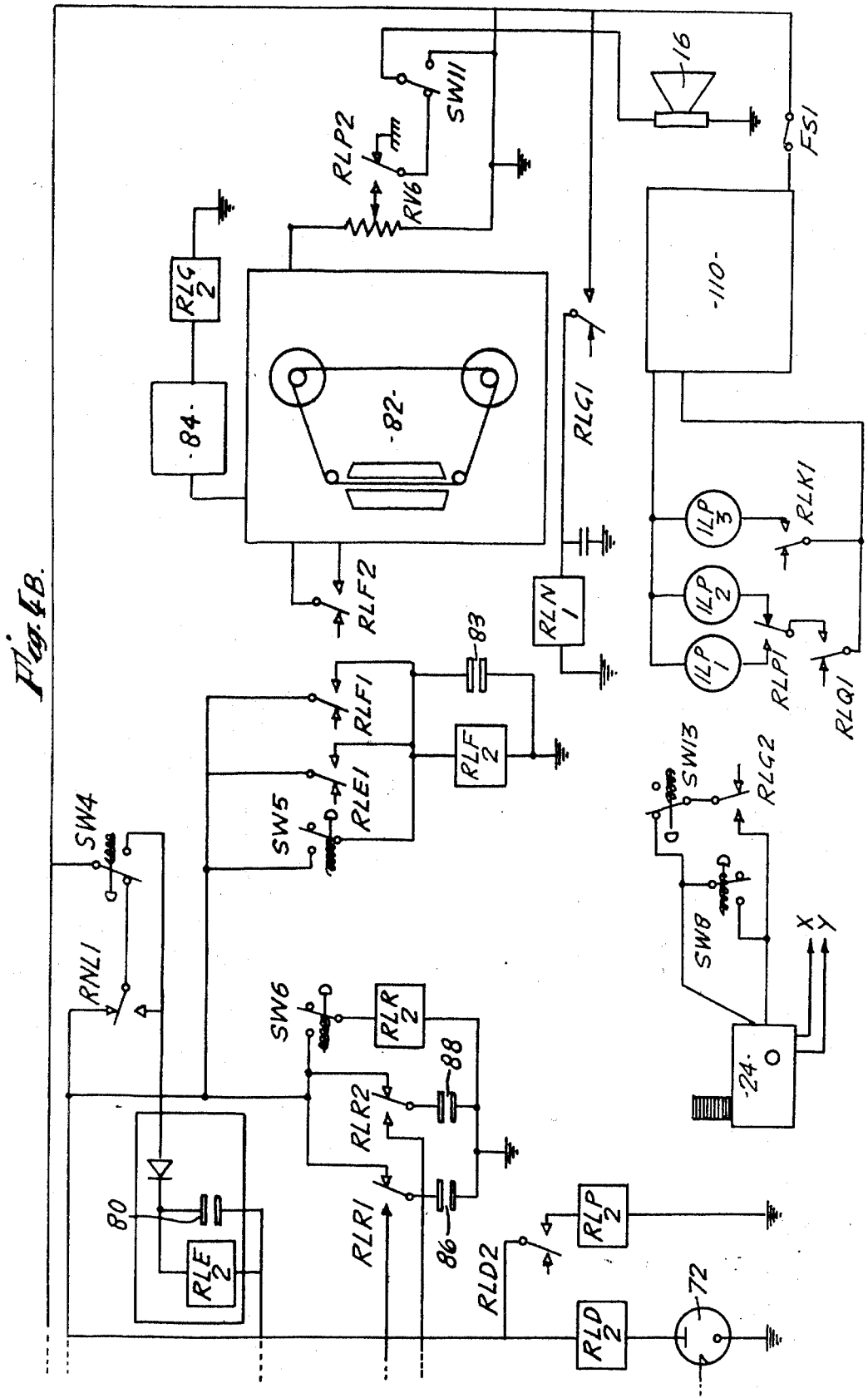
Figure 4C:
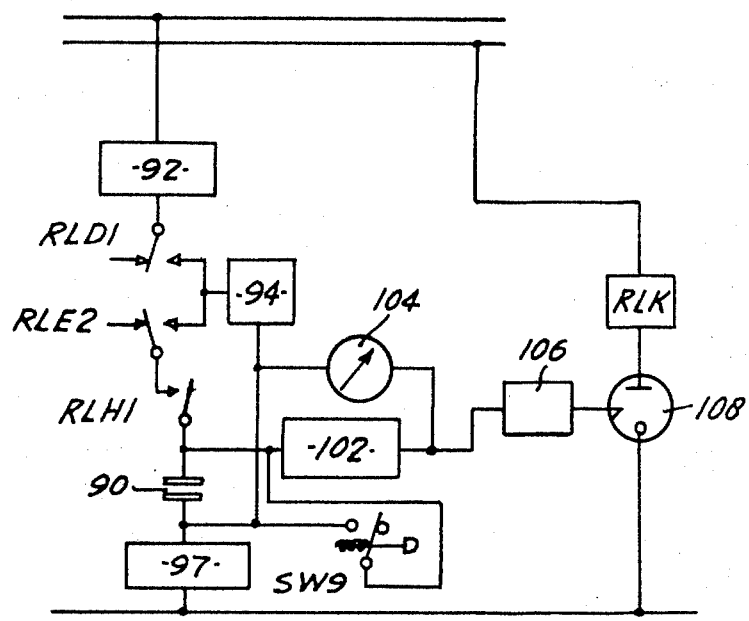

$C_{an}$=1—Correct response for $n$th picture
$C_{an}$=0—Incorrect response for $n$th picture
$R_{dn}$=1—Frame advance for response on $n$th picture
$R_{dn}$=0—No frame advance for response on $n$th picture The screen 14 has three equal sized conducting areas in the positions where the three pictorial representations are displayed. Referring now to FIG. 4, each of the three conducting areas on the screen 30, 31 and 32 is connected to respective impedance convertors 34, 35 and 36. The impedance convertors essentially consist of a resistive chain of two 22 Mohm resistors the area of the screen being connected to the junction of these resistors, a 300 volt D.C. supply being connected across them. On touching the screen the maximum current that can be drawn is 15µa. which is quite safe. Touching the screen generates a negative going pulse which is applied to the inputs of respective amplifiers 38, 39 and 40, through capacitors 42, 43 and 44 respectively. Each amplifier consists of a double triode, the first stage acting as a cathode follower. The output is therefore a positive going pulse which is applied to the trigger electrodes of respective cold cathode tubes 46, 47 and 48, through capacitors 50, 51 and 52. The energizing coils of relays RLA, RLB and RLC are connected in the anode circuits of respective tubes 46, 47 and 48. These relays have their energizing coils connected in parallel to the 300 volt D.C. supply through a contact RLN1 of a relay RLN and a switch SW4. The cathodes of the three tubes 46, 47 and 48 are connected to a circuit 54 which inhibits multiple firing, that is as soon as one tube has fired a bias is applied to the cathodes of the other two tubes to prevent their firing should another section of the screen be touched by the subject.

Photo-conductive cells 56, 57 and 58 are normally connected in series with respective resistors 60a, 61a and 62a and normally with respective capacitors 60, 61 and 62 through relay contacts RLA2, RLB2, and RLC2 between the 300 volt D.C. supply and earth. These photo-conductive cells are associated with respective sections $R_{d1}$, $R_{d2}$ and $R_{d3}$ of the upper zone 21, and if the cells are energized by the light passing through a clear area, the capacitors 60, 61 and 62 are charged through the photo-conductive cells. Similarly, a second set of photo-conductive cells 64, 65 and 66 associated with the respective sections $C_{a1}$, $C_{a2}$ and $C_{a3}$ of the lower zone 22 are normally connected in series with respective resistors 68a, 69a and 70a and normally with respective capacitors 68, 69 and 70 through relay contacts RLA1, RLB1 and RLC1 between the 300 volt D.C. supply and earth.

A correct response is detected as follows. Let us assume that the slide being shown to the child is that shown on the screen in FIG. 1. If the child touches the left hand picture, the tube 46 will fire and relay RLA will be energized. Contacts RLA1 and RLA2 move to the other position. Capacitor 68 will have already been charged by the photo-conductive cell because section $C_{a1}$ will be clear to indicate the correct response. The contact RLA1 on changing-over therefore allows the charge on the capacitor 68 to raise the voltage on the trigger electrode of a cold cathode tube 72. Should the child touch the centre picture relay RLB will be energized by the tube 47 becoming conductive. Contact RLB1 will change over, but since the photo-conductive cell 65 has been blacked out to indicate an incorrect response, the capacitor 69 will not have been charged so that no voltage pulse will be applied to the trigger electrode of the tube 72 which remains non-conductive.

In the case of a slide having three pictures, the frame is advanced automatically after an interval when the child touches any one of the three pictures. The photo-conductive cells 56, 57 and 58 each conduct and the capacitors 60, 61 and 62 are all charged so that when any one of the relays RLA, RLB or RLC operates its appropriate second contact a voltage pulse is applied to the trigger electrode of a cold cathode tube 74 to cause it to conduct. In the case of a slide having only two pictures the appropriate photo-conductive cell for example 58 is blacked out, but in order to prevent the tube 48 from striking and thus inhibiting one of the others from firing when one of the pictures is touched a diode is connected between the trigger electrode and the photoconductive cell to prevent the tube from striking. Respective diodes 76, 77 and 78 have their anodes connected to the trigger electrodes of the tubes 46, 47 and 48.

A relay RLD is connected in the anode circuit of the tube 72. Contact RLD of this relay connects a relay RLP across the 300 volt D.C. supply. Relay RLQ is connected in the anode circuit of the tube 74. Relay RLE is also connected to the anode and is energized by means of a capacitor 80 which discharges therethrough, the capacitor 80 having been previously charged through the contact RLN1. Contact RLE1 changes over and energizes a relay RLF. This latter relay has two contacts RLF1 and RLF2, the first of which acts as a hold-on contact after the relay RLE has dropped out and the second of which connects the drive to the motor of a tape recorder 82. The relay RLF has a capacitor 83 in parallel therewith for the purpose of allowing the motor of the tape recorder 82 to be energized for about ¼ of a second after the contact RLN1 has opened so that the synchronization pulse will be clear of the replay head.

The tape has two channels and is in the form of a continuous loop. The first channel has recorded on it a series of words which agree with the sequence of the slides in the projector 24. The output from this channel is applied across a potentiometer RV6, acting as a volume control. The tap of this potentiometer is connected to the loud-speaker 16 through contact RLP2 and a switch SWL1. The second channel has recorded thereon a series of synchronization pulses for the purpose of effecting the operation of the frame changing mechanism in the projector 24. The output from this channel is applied to a detector 84 which causes a relay RLG to operate each time a synchronization pulse is detected. The relay RLG has two contacts RLG1 and RLG2, the former energizing the relay RLN and the latter closing the circuit in the slide advance mechanism of the projector to enable it to advance by one step. A push button switch SW8 is provided in shunt with the contact RLG2 to enable manual operation of the slide advance mechanism. A further switch SW13 is provided to inhibit the closing of contact RLG2 from advancing the slide mechanism by one step.

The mechanism may be advanced one step manually by the teacher without touching the screen 14 by pressing a switch SW6. This energizes a relay RLR. In the de-energized position, contacts RLR1 and RLR2 keep capacitors 86 and 88 fully charged. When the relay RLR is energized, the contacts RLR1 and RLR2 enable positive pulse to be applied to respective trigger electrodes of the tubes 72 and 74. This then causes relays RLD, RLE and RLG to operate without the screen being touched.

The performance level of the subject is measured by using a device for computing moving weighted averages. This is an analogue computation and its basis of operation is the controlled charge and discharge of a low leakage plastic film capacitor 90. The capacitor 90 is charged from a constant current source 92 through relay contacts RLD1, RLE2 and RLH1. When the contact RLE2 is closed, a current drain circuit 94 preferably comprising a resistor is shunted across the capacitor 90. This allows a small percentage of the charge on the capacitor 90 to leak away. A relay RLH is connected in series with a cold cathode tube 96, whose trigger electrode is connected to each of the leads from the photo-conductive cells 56, 57 and 58 through diodes 98, 99 and 100. The arrangement acts as a "NOR" circuit, and is used to inhibit the action of the performance level computer when there are less than three pictures shown. Provided all three photo-conductive cells are energized the tube 96 will strike and the relay RLH is energized so that the contact RLH1 does not break the circuit in the computer. If one of the photo-conductive cells is blacked out, the tube 96 does not strike and the relay RLH is not energized and so inhibits the computer by opening contact RLH1.

The voltage stored in the capacitor is applied to a zero drain voltage sampler 102. An electrostatic volt metre 104 gives a visual indication of the level of performance. The output from the voltage sampler 102 is applied to a circuit 106 in which a given criterion is set. When the level of performance exceeds this criterion, the circuit 106 emits a positive going pulse which is applied to the trigger electrode of a cold cathode tube 108. This tube 108 is in series with a relay RLK across the 300 volt D.C. supply. A circuit 97 provides a 50 volt reference.

Three lamps ILP1, ILP2 and ILP3 on the teacher's panel inform him of the progress of the subject. These are fed from a 6.3 volt A.C. supply obtained from a power unit 110 from which the 300 volt D.C. supply is obtained. The lamps ILP1 and ILP2 are arranged in parallel although only one can be lit at any one time because only one circuit can be completed through relay contact RLP1 according to whether or not the relay RLP has been energized. A relay contact RLQ1 is also in this circuit so that before either lamp can be lit the contact RLQ1 must be closed. The lamp ILP1 when lit indicates a correct response and the lamp ILP2 when lit indicates an incorrect response. The lamp ILP3 is in series with the contact RLK1 of relay RLK in the computer so that when the lamp is lit it indicates that the subject has reached the level of performance set in the circuit 106.

At the end of each cycle the relay RLG is operated from the synchronisation pulse recorded on the tape. Contacts RLG2 operate the slide advancing mechanism of the projector and contacts RLG1 energize the relay RLN which then resets the electronics remaining energized for approximately half a second to allow for the slide mechanism to change. This may be done manually by means of the switch SW4.

All the switches, lamps, volt metre 104 and other controls are arranged on the panel of the operator's box which is remote from the subject's console.

The terms slide, slide advance, or slide changing mechanism may also be considered to be the equivalent of the terms frame, frame advance, or frame changing mechanism, respectively.

What we claim and desire to secure by Letters Patent is:

1. A touch detecting teaching machine including a display screen; a plurality of aligned transparent touch sensitive areas located on the screen; image projecting means for displaying on one part of the display screen symbolic visual information and on the other part a plurality of further items, each item substantially covering a corresponding area of the plurality of touch sensitive areas, one of which items is related to the symbolic visual information displayed on the first part of the screen; electronic registering means for determining which one of the plurality of touch sensitive areas and hence which further item is first selected by the subject touching the area on which the selected item is projected; means for giving an audible indication only if the correct related item was first touched by the subject; and means for changing the display to another display after a predetermined interval of time from the first touching response whether or not the correct related item has been touched.

2. A touch detecting teaching machine according to claim 1, wherein the plurality of touch sensitive areas are of equal size and the electronic registering means includes a plurality of high resistance D.C. sources, each of said touch sensitive areas being connected to a high resistance D.C. source; means for detecting a slight drop in the voltage across each of said sources when the appropriate areas are touched; and means for utilizing this drop in voltage to register which of the areas has been touched.

3. A touch detecting teaching machine according to claim 2, wherein each resistance D.C. source includes a pair of high value resistors connected across a D.C. supply, the junction between the resistors being connected to the respective touch sensitive areas and wherein there is provided in association with each D.C. source, an A.C. coupled amplifier whose input is connected to the junction between the resistors, the A.C. coupled amplifier emitting a voltage pulse each time the associated touch sensitive area is touched.

4. A touch detecting teaching machine according to claim 1, wherein the electronic registering means includes a plurality of pairs of high value resistors connected across a high tension D.C. voltage supply, the junctions between the pairs of resistors being connected to the respective touch sensitive areas; a plurality of amplifiers, the input to each amplifier being connected to a respective junction between the resistors; a plurality of cold cathode tubes, the trigger electrodes of which are connected to the outputs of respective amplifiers; a plurality of relays, the energizing coils of which are connected in the anode circuits of respective cold cathode tubes, the arrangement being such that when an area is touched the appropriate relay is energized by the firing of its associated cold cathode tube; and means for inhibiting the firing of the other tubes once one tube had fired.

5. A touch detecting teaching machine according to claim 1, wherein the means for displaying the information in pictorial form is a projector having an automatic continuous slide changing mechanism housed within a cabinet, the screen being located on the front panel of the cabinet; and wherein each slide has two coding zones which are not projected onto the screen and each zone is divided into a plurality of sections which are either clear or blacked out, said sections being interposed between respective light sources and photo-conductive cells, the cells associated with one zone being utilized to effect the slide advance mechanism of the projector and the cells associated with the other zone being utilized to operate the means for giving an audible indication only if the related item is touched; whereby the circuit associated with the first set of photoconductive cells is in the form of an "AND" circuit giving an output whenever at least one of the photo-conductive cells is energized and the circuit associated with the second set of photoconductive cells is an "OR" circuit giving an output only when the corresponding electronic registering means associated with the touched area and photo-conductive cells are both energized.

6. A touch detecting teaching machine according to claim 1, wherein there is additionally provided a performance level computer whereby the performance of the subject is computed, said computer comprising an electrical charge storing device; means for adding a fixed amount of charge thereto if a correct response is given; means for subtracting a given percentage of the total charge remaining in the electrical charge storing device at each cycle in the operation of the machine; and means for continuously comparing the charge in the electrical charge storing device with a set criterion in order to assess the subject's progress.

7. A touch detecting teaching machine according to claim 5, wherein each photo-conductive cell charges a capacitor through a contact of a relay associated with the appropriate registering means, said contact having a second position into which it may be switched by the relay when energized to permit the capacitor to discharge thus giving an output voltage pulse.

8. A touch detecting teaching machine according to claim 1, including a projector having an automatic continuous slide changing mechanism, wherein the means for giving an audible indication comprises a tape recorder having a tape closed on itself to form an endless loop, said tape recorder being caused to operate for a given short interval of time whereby an audible word is spoken if the correct item on the screen is touched, the audio output to a speaker passing through a relay contact which is only closed if the related item has been touched.

9. A touch detecting teaching machine according to claim 8, wherein the tape of the tape recorder has two channels, one of said channels being used to record spoken words relating to the correct item on each slide and the other having a series of synchronization pulses recorded thereon for the purpose of operating the slide advance mechanism of the projector after a given delay.

10. A touch detecting machine according to claim 8, wherein the tape of the tape recorder has two channels, one of said channels being used to record spoken words relating to the correct item of each slide and the other having a series of synchronization pulses recorded thereon for the purpose of firstly operating the slide advance mechanism of the projector after a given delay and secondly operating a relay which has a contact in the high tension supply to electronic circuits constituting the registering means whereby said circuits are de-energized after each operation of the machine.

References Cited

UNITED STATES PATENTS

Re. 23,030   8/1948   Holt _____ 35—9 X
3,382,588   5/1968   Serrell et al. _____ 35—9

EUGENE R. CAPOZIO, Primary Examiner

W. H. GRIEB, Assistant Examiner